United States Patent
Kaspit et al.

(10) Patent No.: US 6,990,067 B2
(45) Date of Patent: Jan. 24, 2006

(54) PROTECTION IN A COMMUNICATION NETWORK

(75) Inventors: Idan Kaspit, Rosh Ha'ayn (IL); Tal Muzicant, Givataim (IL); Mark Raymond Zaacks, Rishon Lezion (IL)

(73) Assignee: ECI Telecom Ltd., Petach Tikva (IL)

(*) Notice: Subject to any disclaimer, the term of this patent is extended or adjusted under 35 U.S.C. 154(b) by 921 days.

(21) Appl. No.: 09/885,093

(22) Filed: Jun. 21, 2001

(65) Prior Publication Data

US 2002/0186429 A1 Dec. 12, 2002

(30) Foreign Application Priority Data

Jun. 10, 2001 (IL) .............................................. 143658

(51) Int. Cl.
  *H04J 1/16* (2006.01)
  *H04L 12/26* (2006.01)
  *G06F 11/00* (2006.01)
  *G08C 15/00* (2006.01)
  *G01R 31/08* (2006.01)

(52) U.S. Cl. .......................... 370/223; 370/228; 385/16; 398/5

(58) Field of Classification Search ......... 370/216–228, 370/248, 386, 403–517; 714/43–47, 51–56; 385/16–18, 27–31; 398/1–7, 48
See application file for complete search history.

(56) References Cited

U.S. PATENT DOCUMENTS

| | | | | |
|---|---|---|---|---|
| 4,646,286 A | | 2/1987 | Reid et al. | |
| 5,159,595 A | * | 10/1992 | Flanagan et al. | 370/224 |
| 5,341,364 A | * | 8/1994 | Marra et al. | 370/223 |
| 5,469,428 A | * | 11/1995 | Tokura et al. | 370/224 |
| 5,479,608 A | | 12/1995 | Richardson | |
| 5,495,472 A | * | 2/1996 | Ohara | 370/224 |
| 5,745,476 A | * | 4/1998 | Chaudhuri | 370/222 |
| 5,790,520 A | * | 8/1998 | Iwamoto et al. | 370/223 |
| 5,793,746 A | * | 8/1998 | Gerstel et al. | 370/228 |
| 6,205,562 B1 | * | 3/2001 | Fukushima et al. | 714/43 |
| 6,269,452 B1 | * | 7/2001 | Daruwalla et al. | 714/4 |
| 6,504,963 B1 | * | 1/2003 | Fang et al. | 385/16 |
| 6,657,952 B1 | * | 12/2003 | Shiragaki et al. | 370/223 |

OTHER PUBLICATIONS

ITU–Telecommunication Standardization Sector, Study Period 1997–2000, Source: ALCATEL, "Och–SPRing Network architecture, Network objectives and Application architecture", 6 Pages.
ITU–Telecommunication Standardization Sector, Source: NEC USA, Lucent Technologies<Nortel Networks, Telcordia Technologies, "Two–fiber and four–fiber Applications of Och Shared Protection Ring", 2 Pages.
ITU–Telecommunication Standardization Sector, Source: NEC USA, Lucent Technologies<Nortel Networks, Telcordia Technologles, "Standardization of OCh Shared Protection Ring and its Open Issue List", 3 Pages.
International Telecommunication Union, "Types and Characteristics of SDH Network Protection Archtectures", (1998), 29 Pages.

* cited by examiner

*Primary Examiner*—Man U. Phan
(74) *Attorney, Agent, or Firm*—Browdy and Neimark, P.L.L.C.

(57) ABSTRACT

An optical communication switch operative in a communication network which is adapted to enable protection of a segment, or a number of segments, along an optical path in the communication network.

8 Claims, 4 Drawing Sheets

PROTECTION IN A COMMUNICATION NETWORK

FIELD OF THE INVENTION

The present invention relates in general to optical telecommunication networks, and in particularly to means and methods for protecting such networks.

BACKGROUND OF THE INVENTION

Telecommunication networks where signals are transmitted along optical channels are well known in the art. Unfortunately, these networks suffer occasionally from faults occurring in one of these channels, e.g. due to failing components. Therefore, a protection mechanism is usually incorporated in such systems, allowing the diversion of transmitted communication to a non-failing path, the protection path. Traditionally, monitoring the performance in these telecommunication systems was done while incorporating various alarm conditions. Such alarm conditions alerted a human operator when certain events e.g. a loss of signal or error rates that had exceeded pre-defined thresholds, were detected. In response to such an alarm, the operator would manually switch to a redundant path in the network, allowing the communication to continue.

At a later stage, conventional fiber optic networks have implemented 1:1 redundancy for optical channels extending between two locations in the network, with a certain amount of automatic switching. In these systems, when a loss of signal (to be referred to hereinafter as "LOS") or alarm indication signal ("AIS") conditions are noted, the transmission is diverted to an available redundant path extending between the two locations. Such diversion allows the transmission of signals between these first and second locations to continue.

U.S. Pat. No. 4,646,286 discloses a system wherein a protection switch is effected by detecting a channel failure at receiving end. Thereafter, a protection request is transmitted on the return channel to the transmission end. This request is then used in a controller for the channel to activate a switch to the corresponding protection channel.

Another solution was described in U.S. Pat. No. 5,479,608 that discloses a telecommunication system having 1:N group protection. By this type of solution one redundant channel is allocated to protect a number of operative channels. According to this solution, in response to the detection of an error condition, a request is transmitted to the other side of the system to activate the protection channel.

Our co-pending application U.S. Ser. No. 09/500,823 describes a method for diverting traffic if the energy received over the reception optical link at the second location does not exceed a pre-defined threshold.

In a paper submitted by NEC USA, Lucent Technologies, Nortel Technologies and Telcordia technologies to the International Telecommunication Union ("ITU-T") on February 2000, a method is described for carrying out an optical channel ring protection. Their method requires two fibers for each span of the ring. Each of the fibers carries both working channels (working wavelengths) and protection channels (standby wavelengths). On each fiber, half the channels are defined as working channels and the other half are defined as protection channels, where both the working channels and the protection channels are transmitted at the same direction.

Similarly, Recommendation G.841 of ITU-T dated October 1998 describes under paragraph 7.2 entitled "MS shared protection rings" the use of two fibers for each span of the ring. Again, each of the fibers carries both working channels (working wavelengths) and protection channels (standby wavelengths). The normal traffic carried on working channels in one fiber are protected by the protection channels travelling in the opposite direction along the other fiber.

In a paper submitted by Alcatel to the International Telecommunication Union ("ITU-T") on Sep. 25, 2000, a method for carrying out an optical channel shared protection ring. By the method described two optic fibers are used, each divided into 2 OMS Optical Multiplex Sections ("OMS"). The traffic transmitted in one of the fibers is transmitted clockwise while in the other fiber counter-clockwise. On each fiber half of the available optical channels are used for the working traffic and the other half is used for the protection. This architecture allows that when a fiber breaks, its working channels can be restored on the protection OMS of the other fiber which is counter-propagating.

However, the protection methods described in the art provide a full trail or ring solution, depending on the network architecture chosen. These methods fail to provide a solution to a case where traffic can be diverted to the protection path only for a segment of the network and then reverted to the main path. In particularly, when a ring configuration is used, and the main path is out of order at a certain location, the methods provided by the prior art call for re-routing the traffic to the protection path.

The disclosure of all references mentioned above and through the present specification is hereby incorporated herein by reference.

SUMMARY OF THE INVENTION

It is an object of the present invention to provide an optical system that allows improved performance in particularly in case of a failure occurring in the system.

It is yet another object of the present invention to provide method for diverting transmission from a failing transmission path to an alternative protection path.

Other objects of the invention will become apparent as the description of the invention proceeds.

In accordance with a first embodiment of the present invention, there is provided an optical communication switch comprising at least a first and a second interfaces each adapted to be connected to at least one segment of a first optical path and a segment of a second optical path, wherein said first interface is adapted to:

receive a first part of communication carried along a first segment of said first optical path;

convey a second part of the communication towards said first segment of said first optical path;

receive a second part of communication carried along said first segment of said second optical path; and convey a first part of communication towards said first segment of said second optical path;

wherein said second interface is adapted to:

convey a first part of communication towards a second segment of said first optical path;

receive a second part of the communication carried along said second segment of said first optical path;

convey a second part of communication towards said second segment of said second optical path; and receive a first part of communication carried along said second segment of said second optical path, wherein under normal operating conditions said optical communication switch is adapted to:

receive the first part of communication carried along said first segment of said first optical path at said first interface, and convey it towards said second segment of said first optical path;

receive a second part of the communication carried along said second segment of said first optical path at said second interface, and convey it towards said first segment of said first optical path;

receive the second part of communication carried along said first segment of said second optical path at said first interface, and convey it towards said second segment of said second optical path;

receive a first part of the communication carried along said second segment of said second optical path at said second interface, and convey it towards said first segment of said second optical path;

and wherein in response to a fault detected along the second segment of the first optical path, said optical communication switch is adapted to:

divert the first part of communication received from said first segment of said first optical path at said first interface, and convey it via said second interface towards said second segment of said second optical path; and divert the first part of communication received from said second segment of said second optical path at said second interface, and convey it via said first interface towards said first segment of said first optical path. According to another embodiment of the present invention there is provided an optical communication system comprising a first optical communication switch of the present invention connected to a second optical communication switch of the present invention via at least a first and a second optical paths extending between said first and second optical communication switches, wherein the first optical path is adapted to carry a first part of communication from the first optical communication switch to the second optical communication switch and a second part of the communication from the second optical communication switch to the first optical communication switch;

wherein the second optical path is adapted to carry a first part of communication carried from the second optical communication switch to the first optical communication switch and a second part of the communication from the first optical communication switch to the second optical communication switch;

wherein a bandwidth allocated for carrying the second part of communication along the second optical path is equal or greater than the bandwidth allocated for carrying the first part of communication along the first optical path and a bandwidth allocated to carrying the first part of communication along the second optical path is equal or greater than the bandwidth allocated to carrying the second part of communication along the first optical path; and wherein in a normal type of operation, communication is carried along the first optical path and in response to a fault detected along the first optical path, communication is diverted to the second optical path so that the first part of communication is diverted from the first optical path to be carried as the second part of communication along the second optical path, and the second part of communication is diverted from the first optical path to be carried as the first part of communication along the second optical path.

Alternatively, if only part of the communication that is conveyed via the main path should be protected, the bandwidth allocated for the second part of communication along the second path and/or the bandwidth allocated for the first part of communication along the second path, will be less than that allocated for the first part of communication along the first path and/or the bandwidth allocated for the second part of communication along the first path, respectively.

In accordance with a preferred embodiment of the invention a network element could either be a stand alone optical communication switch of the present invention, or a combination of one or two such switches with an in-line amplifier, Optical Add and Drop Multiplexer ("OADM"), WDM multiplexer/de-multiplexer and the like.

The optical communication system of the present invention comprises two optical paths, where one is used to carry communication under normal operating conditions and will be referred to hereinafter as "the first optical path" or as "the main path". The second, is used to carry communication during a period that communication cannot be transmitted along the main optical path, and this path is referred to herein as "the second optical path" or the "protection path". As can be appreciated by those skilled in the art the protection path can be used for conveying lower priority traffic that is discarded once traffic that under normal operating conditions is conveyed along the main path is switched to the protection path. Also, such a system can also be operated when the protection path is kept idle until communication from the main path should be diverted thereto. All these types of operation are encompassed by the present invention.

According to yet another preferred embodiment of the invention, the bandwidth allocated to carrying the first part of communication along the first optical path is equal to the total accumulative bandwidth of $n_1$, optical channels, each of which is operative at a different wavelength than the others and extends from the first optical communication switch to the second optical communication switch. Preferably, the bandwidth allocated to carrying the second part of communication along that first optical path is equal to the total accumulative bandwidth of $n_2$ optical channels, each operative at a different wavelength and extends from the second optical communication switch to the first optical communication switch. Still preferably, each of the wavelengths belonging to the $n_2$ optical channels is different than the wavelengths belonging to the $n_1$ optical channels used for transmitting the first part of communication in the opposite direction. More preferably, one of the paths carries only working channels (working wavelengths), half of channels are used to carry transmissions at one direction, whereas the other half of channels are used to carry transmissions at the opposite direction. The second path is used as a protection path, where similarly to the working path, half of the protection channels (standby wavelengths) are used to carry transmissions at one direction, and the other half of channels are used to carry transmissions at the opposite direction.

According to another preferred embodiment of the invention, the first and second optical communication switches are operative in a ring-like type of configuration.

According to yet another preferred embodiment of the invention, the first and second optical communication switches are operative in a mesh type configuration.

According to still another preferred embodiment, the system provided further comprises a first communication network device installed in the first optical path extending between the first optical communication switch and the second optical communication switch, and a second communication network device operative to provide essentially the same outcome as that derived from the first communication network device's operation, and is installed in the second optical path extending between the first optical communication switch and the second optical communication switch.

Typically such communication network device may be an in-line amplifier, Optical Add and Drop Multiplexer ("OADM"), WDM multiplexer/de-multiplexer and the like.

By another aspect of the invention there is provided in a network comprising a first optical communication switch connected to at least a first and a second segments of a first optical path and connected to at least a first and a second segments of a second optical path, and a second optical communication switch connected to at least said second and a third segments of said first optical path and connected to at least said second and a third segments of a second optical path, a method of carrying out protection comprising the steps of:

detecting the occurrence of fault at said second segment of said first optical path;

diverting communication carried along said first segment of said first optical path to said second segment of said second optical path;

diverting communication carried along said second segment of said second optical path to said first segment of said first optical path;

diverting communication carried along said second segment of said second optical path to said third segment of said first optical path; and diverting communication carried along said third segment of said first optical path to said second segment of said second optical path, thereby bypassing said second segment of the first path.

According to yet another preferred embodiment of the invention, this method of protection is carried out in response to any one or more of the following events: Loss of Optical Signal ("LOS") at the main path; Optical Signal to Noise Ratio (OSNR) being under a predefined threshold value for at least some of the optical channels extending along the main path; exceeding a pre-defined threshold level of degradation in quality of the digital signals, and the like.

BRIEF DESCRIPTION OF THE DRAWINGS

The present invention will be understood and appreciated more fully from the following detailed description, taken in conjunction with the drawings in which.

DETAILED DESCRIPTION OF THE INVENTION

Figure 1A:
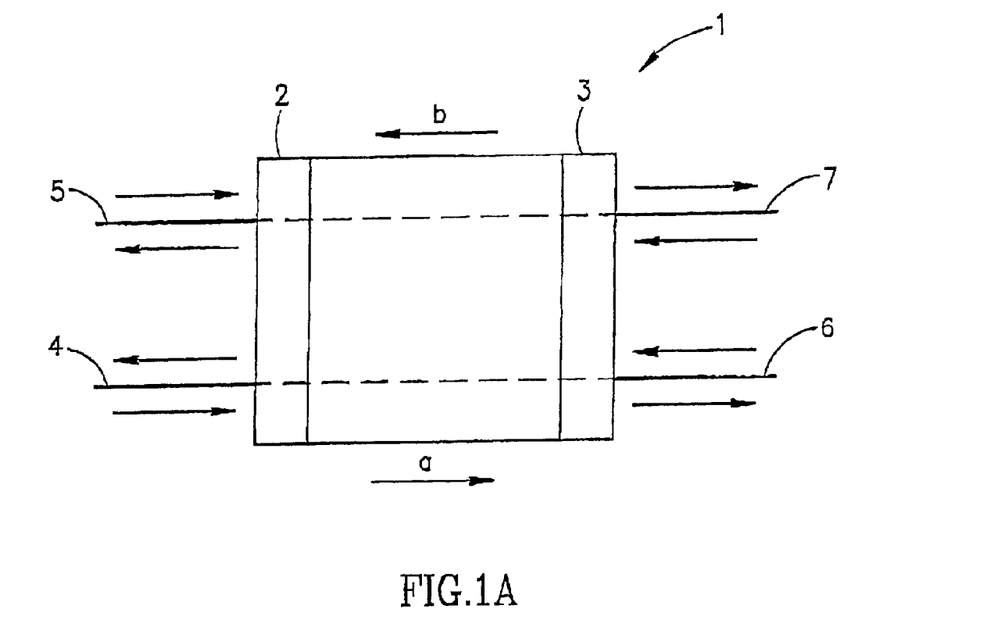
FIGS. 1A and 1B present a schematic illustration of the optical communication switch operative in accordance with the present invention under normal operating conditions and in protection mode, respectively.
Figure 1B:
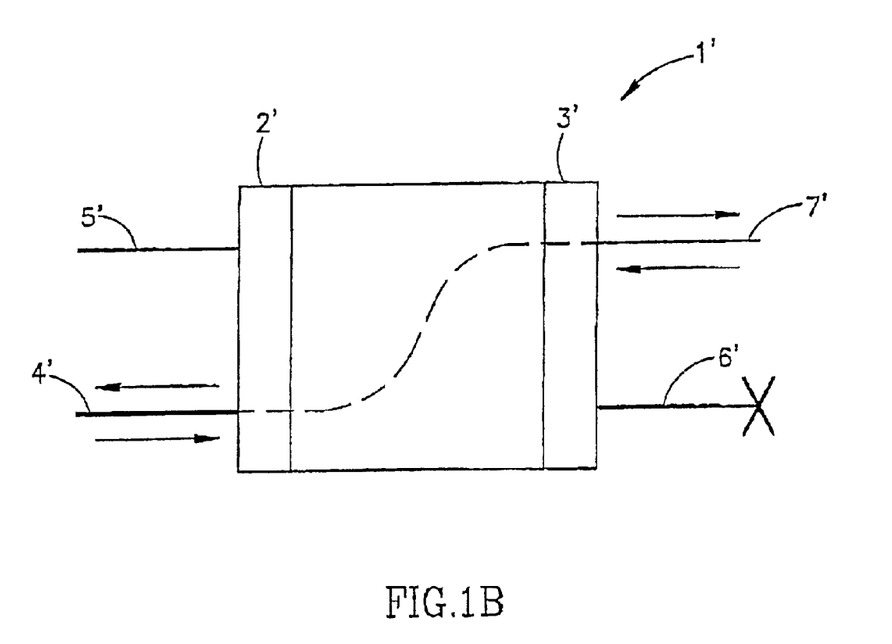

Reference is now made to FIGS. 1A and 1B, which illustrates an example of an optical communication switch 1 of the present invention.

Optical communication switch 1 comprises a first interface 2 and a second interface 3. Interface 2 is adapted to be connected to a first segment of a first optical fiber 4 (main fiber) and to a first segment of a second optical fiber 5 (protection fiber).

According to this example, interface 2 is adapted to receive communication carried along segment 4 of a first optical fiber in direction a and to convey communication received from interface 3 to segment 4 in direction b. Interface 2 is also adapted to receive communication carried along segment 5 of a second optical fiber in direction a and to convey communication received from interface 3 to segment 5, in the b direction. Similarly, mutatis mutandis, interface 3 is adapted to receive communication carried along segment 4 in direction b and convey communication received from interface 2 to segment 6 of the first optical fiber in direction a. Interface 3 is also adapted to receive communication carried along segment 7 of the second optical fiber in direction b and convey communication received from interface 2 to segment 7, in the direction a.

Under normal operating conditions, switch 1 is designed to operate in the following way. Communication is received at interface 2 in the a direction from segment 4 of the main fiber and from segment 5 of the protection fiber, and is conveyed via interface 3 to segment 6 of the main optical fiber and to segment 7 of the protection fiber, respectively. As to the b direction, communication received at interface 3 from segment 6 of the main fiber and from segment 7 of the protection fiber is conveyed via interface 2 to segments 4 and 5, respectively.

Turning now to FIG. 1B, when a fault is detected along segment 6', the communication transport is changed at switch 1 in the following way.

Communication will still be received at interface 2' in a direction from segment 4' of the main fiber and from segment 5' of the protection fiber. However, this time the communication received via segment 4', and is diverted so that it will be conveyed via interface 3' to segment 7' of the protection fiber, while the communication received (if present) from segment 5' at interface 2' will be discarded. As to the b direction, communication will be received at interface 3' only from segment 7' of the protection fiber and will be diverted via interface 2' to segment 5'.

Figure 2A:
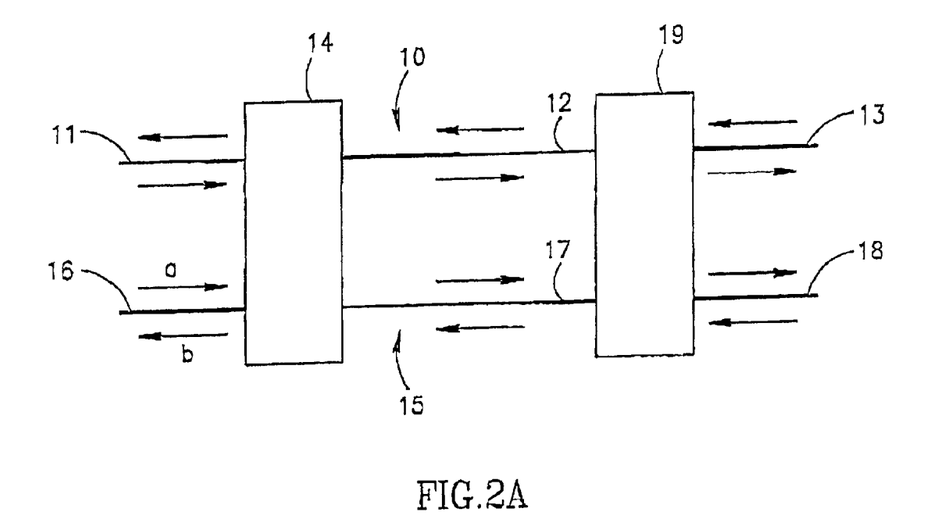
FIGS. 2A and 2B demonstrate a method of carrying a segment protection in accordance with the present invention.
Figure 2B:
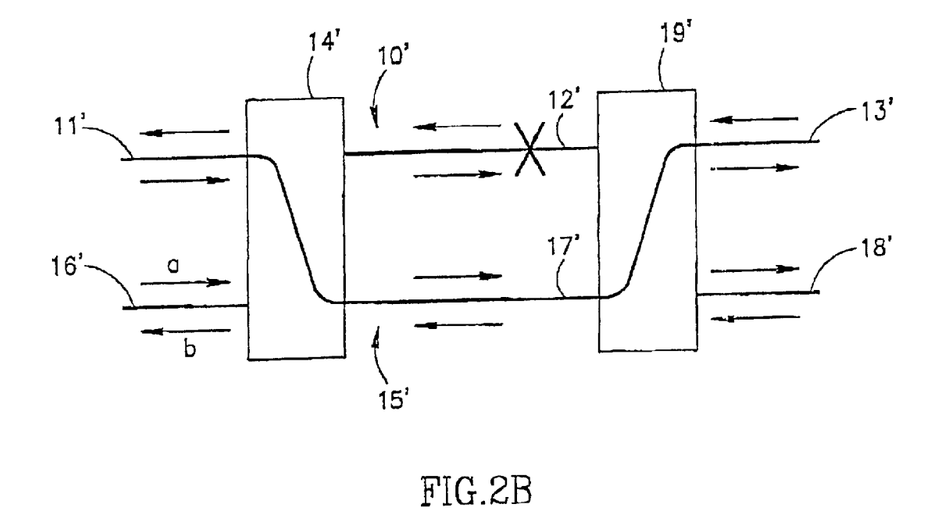

Let us now turn to FIGS. 2A and 2B that demonstrate a segment protection method of the present invention. The main fiber 10 shown in FIG. 2A as comprising segments 11, 12 and 13 is used under normal operating conditions for conveying the main traffic. Protection fiber 15 shown in this figure, comprises the three segments 16, 17 and 18 may be used for conveying low priority traffic or even be kept idle. In order to enable the protection of segment 12, two switches 14 and 19 are installed. In response to detection of a fault at segment 12 of fiber 10, the system is diverted to a protection mode (FIG. 2B).

As shown in this figure, in the protection mode communication carried along segment 11' in the a direction is diverted at switch 14' to segment 17' and communication in the b direction carried along segment 17' is diverted at switch 14' to segment 11'. Similarly, communication carried along segment 17' in the a direction is diverted at switch 19' and forwarded to segment 13' whereas communication in the b direction carried along segment 13' is diverted at switch 19' and is forwarded to segment 17'. Traffic that will now reach switch 14' from segment 16' (if present) will be discarded, and so will the traffic reaching switch 19' from segment 18'.

Figure 3:
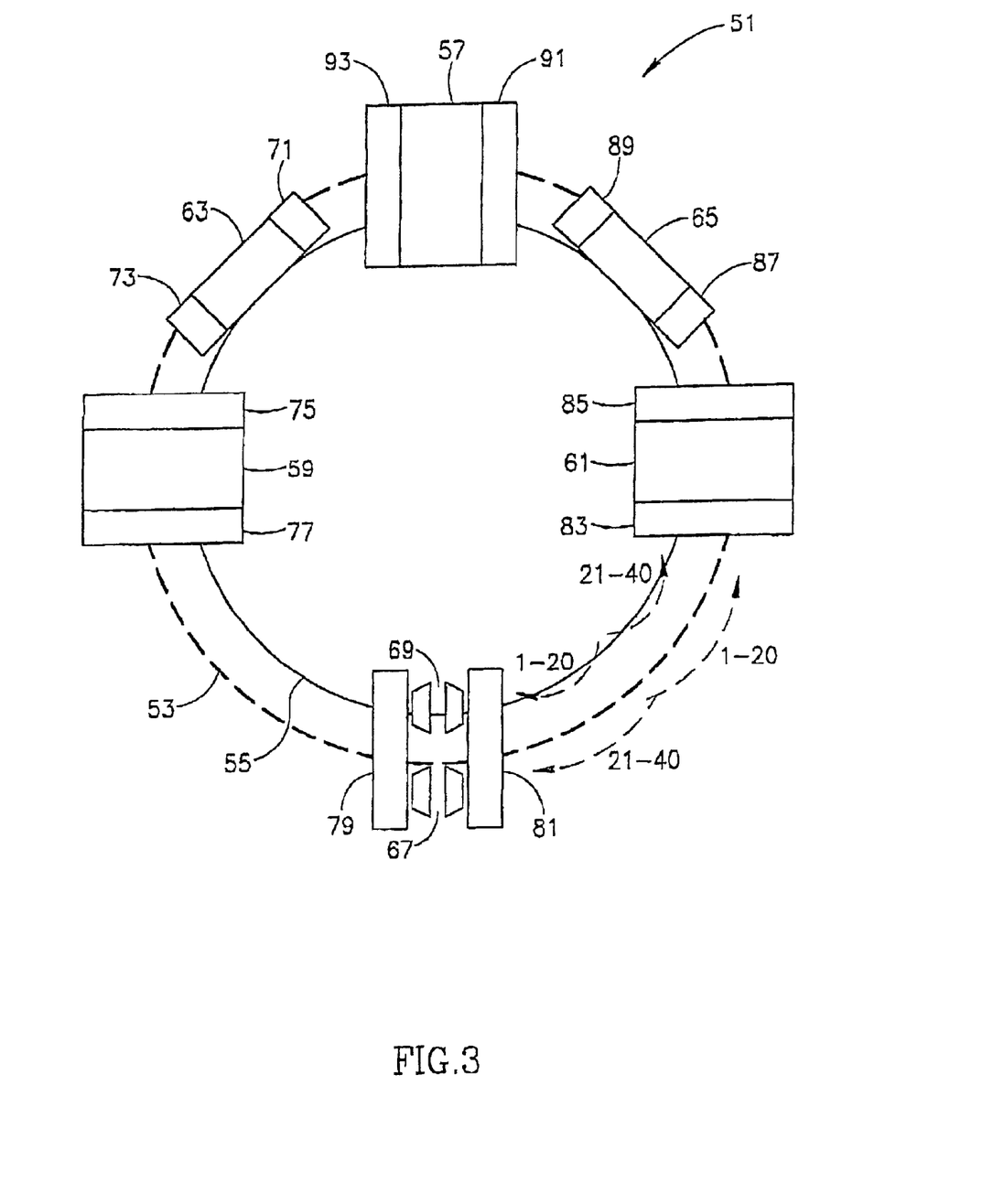
FIG. 3 illustrates a schematic illustration of an optical network operative in accordance with the present invention.

FIG. 3 illustrates a network 51 operative in accordance with a preferred embodiment of the present invention. Network 51 shown in this example comprises a number of network elements interconnected by a two-fiber ring (2F) 53 and 55. Fiber 53, is the working fiber, fiber 55 is the protection fiber. The network elements presented in this example are three Optical Add and Drop Muliplexers (OADMs) 57, 59 and 61, two In-Line Amplifiers (ILAs) 63 and 65 and two pairs of muliplexer/de-muliplexer 67 and 69. The network is designed to allow transmission of 40 channels traffic. Out of these 40 channels, the traffic of 20 channels (designated channels 1 to 20) is transmitted in the clockwise direction along fiber 53, whereas the traffic of the remaining 20 channels (designated as channels 21 to 40) is transmitted in the anti-clockwise direction. Fiber 55 that is used as the protecting fiber and is designed to allow the transmission of the 20 channels 1 to 20 in the anti-clockwise direction, whereas the traffic of the remaining 20 channels (channels 21 to 40) in the clockwise direction.

In order to allow segment protection for every path segment, extending between any two neighboring elements in the network, communication switches 71, 73, 75, 77, 79, 81, 83, 85, 87, 89, 91 and 93 are located before and after each network element, thereby defining a segment of protection.

Whenever a failure occurs in the main (working) fiber, communication is allowed by using the protection concept of the present invention. Let us consider for example that a failure of fiber 53 happened at the segment extending between switches 77 and 79. Using ring protection methods of the prior art, all the traffic of the main fiber would have been diverted so that if a transmission were to be passed from element 67 to element 59, it would be diverted at element 67 to fiber 55 and be transmitted in the anti-clockwise direction towards element 59. In other words, the traffic under these circumstances shall be forwarded via a considerably longer path (that is equal to the remaining part of the ring).

By carrying out the segment protection of the present invention the traffic between elements 77 and 79 is diverted from main fiber 53 to the protection fiber 55, whereas the traffic along the rest of the ring is unaffected.

Another advantage offered by the present invention is in the protection of a piece of equipment instead of a segment. When a network device has to be serviced, e.g. due to maintenance, upgrade etc, rather then to switch to protection mode which will practically almost double the optical path transversed resulting in degradation of the signals' quality as explained above, the protection procedure offered by the present invention rather simple. Let us consider a case where multiplexer 67 of the network described in FIG. 3 has to be serviced. According to the present invention the traffic is diverted from segment extending between switches 79 and 81 to the protection fiber 55 (a segment that includes the protecting equipment, multiplexer/de-multiplexer 69) whereas the rest of the ring is not affected by the servicing of multiplexer 67, nor is there any affect upon the length of the path transversed.

Another advantage that is offered by implementing the communication transport concept of the present invention is the possibility to reduce the number of devices required to be installed in the network. As will be appreciated by a man skilled in the art, the protection offered by the two-fiber network described herein using bi-directional traffic can also be carried out using a four-fiber uni-directional network. Naturally, the latter network will be a more expensive network and will involve a considerable redundancy. The problem arises while using the present invention, lies with uni-directional devices such as in-line amplifiers, filters, MUX/DEMUX, etc while operating a network as described in FIG. 3. The obvious solution would be to double the number of such in-line devices so that each of the four traffic components (two to each direction) is conveyed properly through such in-line devices.

Figure 4:
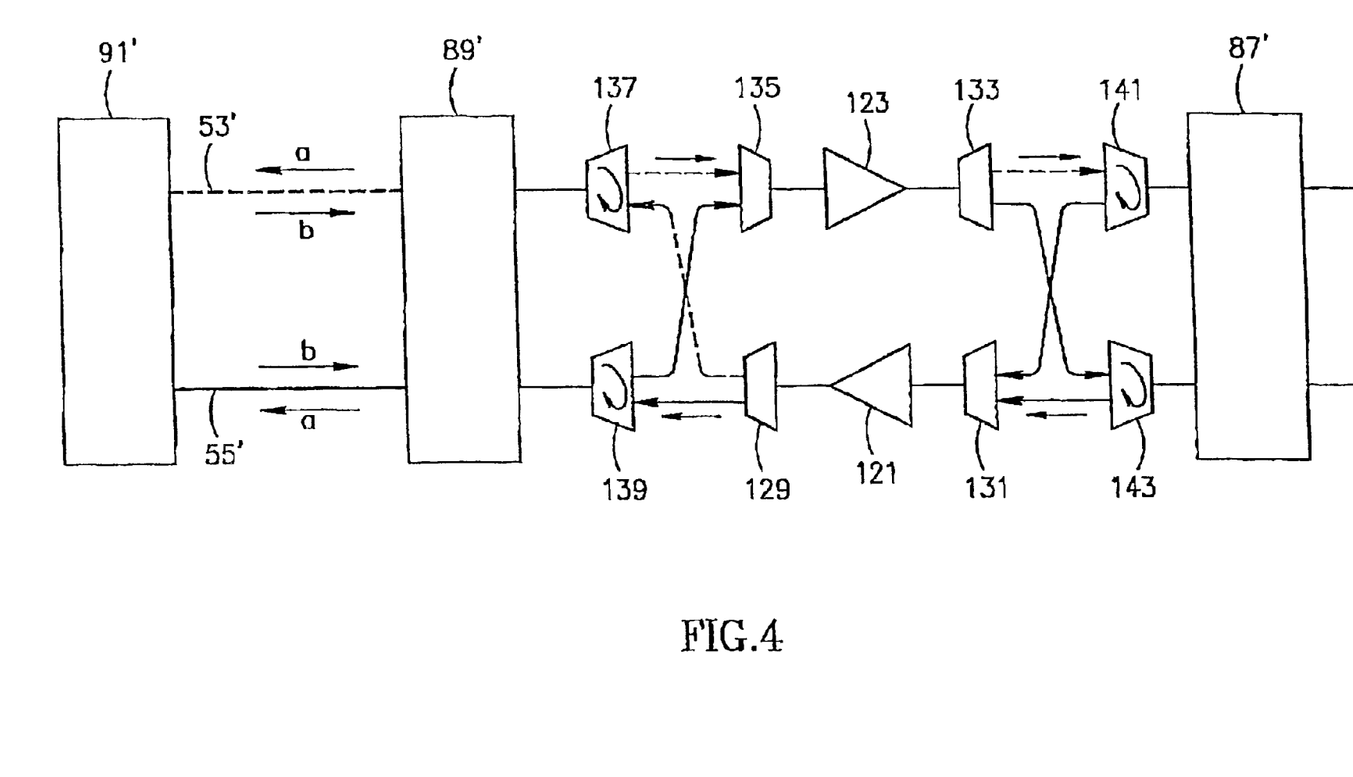
FIG. 4 presents a schematic illustration of an embodiment according to the present invention, involving in-line amplifiers.

A way to overcome this problem is demonstrated in FIG. 4 which is an exploded view of a part of the 51 network illustrated in FIG. 3. The part presented in FIG. 4 is the one extending between switch 87 and switch 91, designated herein as 87' and 91', respectively). In-line amplifier shown in FIG. 3 as element 65 is represented in FIG. 4 by the two amplifiers 121 and 123 installed in paths 53' (main path) and 55, (protection path).

According to this example, part of the communication carried along path 53' is in direction a and another part is in direction b. These communication parts will be referred to herein as "COM53a" and "COM53b", respectively. Similarly, part of the communication carried along path 55' is in direction a and another part is in direction b. These parts will be referred to herein as "COM55a" and "COM55b", respectively. Typically, the COM53a is transmitted at the same wavelength range as that of COM55b and COM53b is transmitted at the same wavelength range as that of COM55a. Under normal operating conditions, COM53a passes through switch 89' then through circulator 137. COM55a also passes through switch 89' and then through circulator 139. Both COM53a and COM55a are combined in coupler 135 and are transferred to amplifier 123. After being amplified, the combination is forwarded to filter 133 where it is separated into amplified COM53a and COM55a. COM53a is then conveyed via circulator 141 to switch 87' and then along the downstream of path 53'. As to COM55a, after passing through filter 133, it is conveyed via circulator 143 to switch 87' and then along the downstream of path 55'. A reverse type of operation, mutatis mutanis, is used for conveying communication along paths 53' and 55' in the b direction. COM53b passes through switch 87' then through circulator 141. COM55b also passes through switch 87' and then through circulator 143. Both COM53b and COM55b are combined in coupler 131 and are transferred to amplifier 121. After being amplified, the combination is forwarded to filter 129 where it is separated into amplified COM53b and COM55b. COM53b is then conveyed via circulator 137 to switch 89' and then along the upstream of path 53'. As to COM55b, after passing through filter 129, COM55b is conveyed via circulator 139 to switch 89' and then along the upstream of path 55'.

The protection as provided by the present invention for the 53' segment extending between switch 89' and switch 91' would be carried out in a similar manner to that described in FIG. 2.

As will be appreciated by those skilled in the art, although devices 129 and 133 were referred to as filters, other devices such as splitters, interleavers and the like, capable of carrying out the required separation between the main and the protection communications, may be used. Also, devices 131 and 135 were referred to as couplers in the above description. Other devices such as multiplexers, interleavers, combiners and the like may be used as an alternative to such couplers.

It will be appreciated that the above-described methods may be varied in many ways, including but not limited to, changing the exact implementation used. It should also be appreciated that the above described description of methods and networks are to be interpreted as including network in which the methods are carried out and methods of using the network components.

The present invention has been described using non-limiting detailed descriptions of preferred embodiments thereof that are provided by way of example and are not intended to limit the scope of the invention. It should be understood that features described with respect to one embodiment may be used with other embodiments and that not all embodiments of the invention have all the features shown in a particular figure. Variations of embodiments described will occur to persons of the art. Furthermore, the terms "comprise", "include", "have" and their conjugates shall mean, when used in the claims "including but not necessarily limited to".

What is claimed is:

1. An optical communication switch comprising at least a first and a second interfaces each adapted to be connected to at least one segment of a first optical path and a segment of a second optical path,
   wherein said first interface is adapted to:
   receive a first part of communication carried along a first segment of said first optical path;
   convey a second part of the communication towards said first segment of said first optical path;
   receive a second part of communication carried along said first segment of said second optical path; and
   convey a first part of communication towards said first segment of said second optical path;
   wherein said second interface is adapted to:
   convey a first part of communication towards a second segment of said first optical path;
   receive a second part of the communication carried along said second segment of said first optical path;
   convey a second part of communication towards said second segment of said second optical path; and
   receive a first part of communication carried along said second segment of said second optical path,
   wherein under normal operating conditions said optical communication switch is adapted to:
   receive the first part of communication carried along said first segment of said first optical path at said first interface, and convey it towards said second segment of said first optical path;
   receive a second part of the communication carried along said second segment of said first optical path at said second interface, and convey it towards said first segment of said first optical path;
   receive the second part of communication carried along said first segment of said second optical path at said first interface, and convey it towards said second segment of said second optical path;
   receive a first part of the communication carried along said second segment of said second optical path at said second interface, and convey it towards said first segment of said second optical path;
   and wherein in response to a fault detected along the second segment of the first optical path, said optical communication switch is adapted to:
   divert the first part of communication received from said first segment of said first optical path at said first interface, and convey it via said second interface towards said second segment of said second optical path; and
   divert the first part of communication received from said second segment of said second optical path at said second interface, and convey it via said first interface towards said first segment of said first optical path.

2. An optical communication system comprising a first optical communication switch of the present invention connected to a second optical communication switch of the present invention via at least a first and a second optical paths extending between said first and second optical communication switches,
   wherein the first optical path is adapted to carry a first part of communication from the first optical communication switch to the second optical communication switch and a second part of the communication from the second optical communication switch to the first optical communication switch;
   wherein the second optical path is adapted to carry a first part of communication carried from the second optical communication switch to the first optical communication switch and a second part of the communication from the first optical communication switch to the second optical communication switch;
   wherein a bandwidth allocated for carrying the second part of communication along the second optical path is equal or greater than the bandwidth allocated for carrying the first part of communication along the first optical path and a bandwidth allocated to carrying the first part of communication along the second optical path is equal or greater than the bandwidth allocated to carrying the second part of communication along the first optical path; and
   wherein in a normal type of operation, communication is carried along the first optical path and in response to a fault detected along the first optical path, communication is diverted to the second optical path so that the first part of communication is diverted from the first optical path to be carried as the second part of communication along the second optical path, and the second part of communication is diverted from the first optical path to be carried as the first part of communication along the second optical path.

3. A system according to claim 2, adapted to be installed in a ring type configuration.

4. A system according to claim 2, adapted to be installed in a mesh type configuration.

5. A system according to claim 2, further comprising a first communication network device installed in said first optical path extending between said first optical communication switch and said second optical communication switch, and a second communication network device operative to provide essentially the same outcome as that derived from said first communication network device's operation, and is installed in said second optical path extending between said first optical communication switch and said second optical communication switch.

6. A system according to claim 5, wherein said first communication network device is a member selected from the group comprising of in-line amplifier, Optical Add and Drop Multiplexer, and WDM multiplexer/de-multiplexer.

7. In a network comprising a first optical communication switch connected to at least a first and a second segments of a first optical path and connected to at least a first and a second segments of a second optical path, and a second optical communication switch connected to at least said second and a third segments of said first optical path and connected to at least said second and a third segments of a second optical path, a method of carrying out protection comprising the steps of:

detecting the occurrence of fault at said second segment of said first optical path;

diverting communication carried along said first segment of said first optical path to said second segment of said second optical path;

diverting communication carried along said second segment of said second optical path to said first segment of said first optical path;

diverting communication carried along said second segment of said second optical path to said third segment of said first optical path; and     diverting communication carried along said third segment of said first optical path to said second segment of said second optical path,     thereby bypassing said second segment of the first path.

8. A method according to claim 7, wherein the detecting step is based on at least one event that is a member of the group comprising: loss of optical signal at a main path, lowered Optical Signal to Noise Ratio (OSNR) under a predefined threshold value, and exceeding a pre-defined threshold level of degradation in quality of the digital signals conveyed.

\* \* \* \* \*